(12) United States Patent
Lyatkher

(10) Patent No.: US 7,566,983 B1
(45) Date of Patent: Jul. 28, 2009

(54) POWER INSTALLATION FOR CONVERSION OF ENERGY OF WATER AND AIR STREAMS

(76) Inventor: Victor Lyatkher, 563 Bartow La., Richmond Hts., OH (US) 44143

( * ) Notice: Subject to any disclaimer, the term of this patent is extended or adjusted under 35 U.S.C. 154(b) by 0 days.

(21) Appl. No.: 12/290,934

(22) Filed: Nov. 5, 2008

(30) Foreign Application Priority Data

Aug. 6, 2008 (RU) ............... 2008132018

(51) Int. Cl.
*F03B 13/00* (2006.01)
*F03B 13/10* (2006.01)
*F03D 9/00* (2006.01)

(52) U.S. Cl. .............. 290/54; 290/43; 290/44; 290/55

(58) Field of Classification Search ........... 290/43, 290/44, 54, 55
See application file for complete search history.

(56) References Cited

U.S. PATENT DOCUMENTS

| | | | | |
|---|---|---|---|---|
| 2,153,523 A * | 4/1939 | Edmonds et al. | ............ | 290/55 |
| 2,177,801 A * | 10/1939 | Erren | ............ | 290/55 |
| 3,513,992 A * | 5/1970 | Handler | ............ | 414/259 |
| 4,061,926 A * | 12/1977 | Peed | ............ | 290/55 |
| 4,088,352 A * | 5/1978 | Kling | ............ | 290/55 |
| 4,292,540 A * | 9/1981 | Thompson et al. | ............ | 290/55 |
| 5,506,453 A * | 4/1996 | McCombs | ............ | 290/44 |
| 6,100,600 A * | 8/2000 | Pflanz | ............ | 290/54 |
| 6,194,791 B1 * | 2/2001 | Wells | ............ | 290/53 |
| 6,278,197 B1 * | 8/2001 | Appa | ............ | 290/55 |
| 6,294,844 B1 * | 9/2001 | Lagerwey | ............ | 290/55 |
| 6,320,273 B1 * | 11/2001 | Nemec | ............ | 290/55 |
| 6,492,743 B1 * | 12/2002 | Appa | ............ | 290/55 |
| 6,652,221 B1 * | 11/2003 | Praenkel | ............ | 415/3.1 |
| 6,831,374 B2 * | 12/2004 | Seki | ............ | 290/44 |
| 6,856,042 B1 * | 2/2005 | Kubota | ............ | 290/55 |
| 7,075,189 B2 * | 7/2006 | Heronemus et al. | ............ | 290/44 |
| 7,105,942 B2 * | 9/2006 | Henriksen | ............ | 290/55 |
| 7,242,107 B1 * | 7/2007 | Dempster | ............ | 290/55 |
| 7,307,356 B2 * | 12/2007 | Fraenkel | ............ | 290/54 |
| 7,397,144 B1 * | 7/2008 | Brostmeyer et al. | ............ | 290/53 |
| 7,471,006 B2 * | 12/2008 | Janca et al. | ............ | 290/43 |

(Continued)

FOREIGN PATENT DOCUMENTS

RU 2052658 1/1996

(Continued)

*Primary Examiner*—Nicholas Ponomarenko
*Assistant Examiner*—Pedro J Cuevas
(74) *Attorney, Agent, or Firm*—Aleksandr Smushkovich

(57) ABSTRACT

The proposed water-wind combined energy conversion installation comprises a hydro-unit including two lower rotors below the water level furnished with blades providing their rotation in opposite directions around a vertical axe, lower inductors, a wind-unit including two upper rotors above the level furnished with blades providing their rotation in opposite directions around the axe, upper inductors, a base structure including a lower and upper polygon-shaped frames, each including outer rods joined in vertexes, inner rods linking the non-adjacent vertexes joined by internal junctions, a float unit disposed below the reservoir's freezing lever and the level of waves produced by winds, secured substantially to the reservoirs' bottom, a linear tubular tower supported by the float unit, wherein the frames are fixed to the tower through the internal junctions, the lower inductors are fixed to the vertexes of lower frame and the upper inductors are fixed to the vertexes of upper frame.

2 Claims, 1 Drawing Sheet

U.S. PATENT DOCUMENTS

| | | | |
|---|---|---|---|
| 7,508,088 B2 * | 3/2009 | Kothnur et al. | 290/44 |
| 2004/0041405 A1 * | 3/2004 | Seki | 290/54 |
| 2004/0041406 A1 * | 3/2004 | Seki | 290/54 |
| 2005/0134050 A1 * | 6/2005 | Salls, Jr. | 290/54 |
| 2005/0236841 A1 * | 10/2005 | Henriksen | 290/54 |
| 2006/0125242 A1 * | 6/2006 | Fraenkel | 290/54 |
| 2006/0232075 A1 * | 10/2006 | Fraenkel | 290/54 |
| 2006/0244267 A1 * | 11/2006 | Fraenkel | 290/54 |
| 2008/0226450 A1 * | 9/2008 | Clarke et al. | 416/124 |
| 2008/0258466 A1 * | 10/2008 | Bridwell | 290/54 |
| 2008/0296899 A1 * | 12/2008 | Janca et al. | 290/54 |
| 2009/0072542 A1 * | 3/2009 | Janca et al. | 290/54 |
| 2009/0091135 A1 * | 4/2009 | Janca et al. | 290/54 |

FOREIGN PATENT DOCUMENTS

RU 2242634 12/2004

* cited by examiner

POWER INSTALLATION FOR CONVERSION OF ENERGY OF WATER AND AIR STREAMS

CROSS REFERENCES TO RELATED APPLICATIONS

This U.S. patent application claims priority under 35 U.S.C. 119 (a) through (d) of a Russian Federation patent application RU2008132018 filed on 6 Aug. 2008.

FIELD OF THE INVENTION

The invention relates to electric power generation devices, and can be used for complex conversion of wind and water (e.g. ocean, sea, or river currents) streams energy into electric power.

BACKGROUND OF THE INVENTION

There is known a power installation, comprising two hydro-units and a supporting carcass, wherein the first hydro-unit is mounted coaxially to the second hydro-unit. The units each includes a rotor furnished with blades, wherein the blades are so orientated that provide rotation of the rotors in the opposite directions, not rotatable cases facing each other are fixed to a cross-shaped frame coupled to the ends of arms with the carcass located outside of the rotation trajectory of the blades, which carcass is supported underneath by a floatable platform kept in floating position at a predetermined depth, mounted to bottom anchors by means of elastic straps (Patent of Russian Federation 2052658 issued 20 Jan. 1996).

Shortcomings of this solution are low efficiency and impossibility to use the installation effectively enough in a wide range of speed of water currents.

The most close prior art solution to the invention in terms of technological essence and achievable result is a power installation for conversion of water streams comprising an orthogonal balanced hydro-unit including at least two bladed rotors with vertical axed of rotation, mounted below the water level one above the other, capable of rotation in the opposite directions, an electro-generator and a system of fastening to a base structure (Patent of Russian Federation 2242634, issued 20 Dec. 2004).

The aforesaid hydro-unit comprises two annular rotors having blades so arranged relatively to the water stream that the rotors are rotatable in the opposite directions around a vertical axe, linear (arc) electro-generators with electric current takeoff means, a base represented in the form of a central pylon attached to the bottom of a water reservoir, a suspension members that transfer radial loads from the blades to the central pylon. The design of such unit allows considerably reducing reactive loads. However the presence of the electric current takeoff means reduces reliability of the unit, and the suspension system offers hydro-dynamical resistance to the stream that reduces power efficiency of the unit.

The present invention is therefore directed to solving a problem of decreasing both aero- and hydro-resistance of a power installation and reduction of losses of energy in support elements of the power unit, as well as combining the function of floating support with the function of support for an additional power source in the form of a wind power unit. The proposed invention allows increasing reliability and overall economic efficiency of the power installation.

BRIEF DESCRIPTION OF THE INVENTION

The aforesaid problem is solved, and the technological result is achieved due to an innovative design of the power installation for conversion of energy of air and water streams. The inventive power installation comprises: an orthogonal balanced hydro-unit including at least two short-circuited lower rotors (in some embodiments it can include four, six, and so on rotors) mounted in a water reservoir (ocean, sea, river, etc.) below the water level, the lower rotors are furnished with blades so configured that provide rotation of the lower rotors in two mutually opposite directions around a vertical axe, a number of lower inductors magnetically interacting with the lower rotors, the lower rotors and lower inductors form a lower electro-generator; an orthogonal balanced wind-unit including at least two short-circuited upper rotors (in some embodiments it can include four, six, and so on rotors), the upper rotors are furnished with blades so configured that provide rotation of the upper rotors in two mutually opposite directions around the vertical axe, a number of upper inductors magnetically interacting with the upper rotors, the upper rotors and upper inductors form an upper electro-generator; a base structure that includes a lower immovable polygon-shaped frame and an upper immovable polygon-shaped frame, the frames include outer rigid rods (ribs) joined with each other in the vertexes of the frame, and inner rigid rods linking the non-adjacent vertexes of the frame and joined with each other by means of internal junctions formed in the crossing points of the inner rods, the upper frame and the lower frame are disposed in substantially parallel horizontal planes; the base structure includes a number of bottom anchors, a float unit with positive buoyancy disposed below the freezing lever of the water reservoir and below the level of waves produced by winds, the float unit is secured by means of anchor straps to the bottom anchors, a linear tubular tower, preferably of a truss-type, supported by the float unit, wherein the lower and upper frames are fixedly attached to the tower through the internal junctions, the lower inductors are fixedly attached to the vertexes of the upper frame and the upper inductors are fixedly attached to the vertexes of the lower frame.

Figure 1:
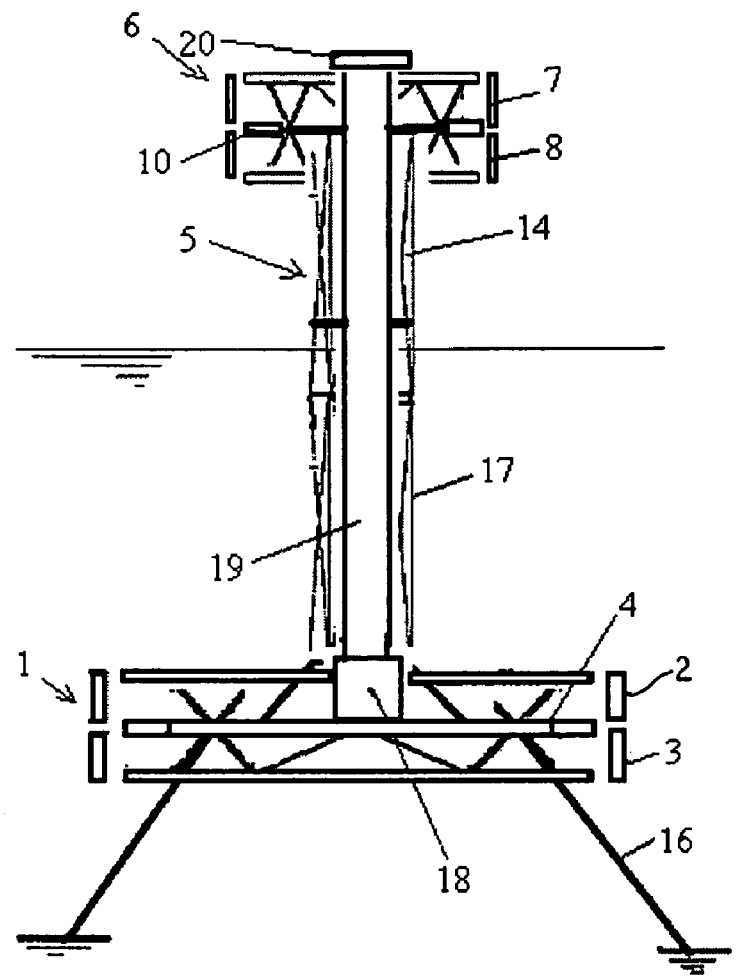
FIG. 1 shows a general schematic front view of the inventive power unit, according to a preferred embodiment of the present invention.
Figure 2:
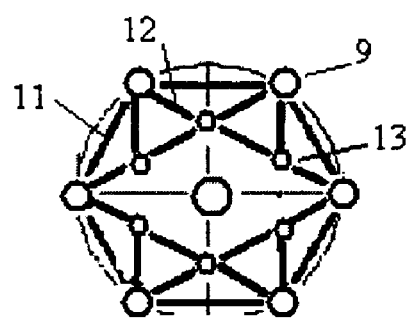
FIG. 2 shows a schematic plan view of the polygon-shaped frame, according to the preferred embodiment of the present invention depicted on FIG. 1.

Each reference numeral indicated on FIGS. 1-2 is designated to an element of the inventive structure described herein below. A first time introduced reference numeral in the description is enclosed into parentheses.

DETAIL DESCRIPTION OF A PREFERRED EMBODIMENT OF THE INVENTION

While the invention may be susceptible to embodiment in different forms, there are shown in the drawing, and will be described in detail herein, specific embodiments of the present invention, with the understanding that the present disclosure is to be considered an exemplification of the principles of the invention, and is not intended to limit the invention to that as illustrated and described herein.

In a preferred embodiment illustrated on FIGS. 1 and 2, the inventive power installation comprises: an orthogonal balanced hydro-unit (1) including two short-circuited lower rotors (2) and (3) mounted in a water reservoir (ocean, sea, river, etc.) below the water level, the lower rotors are furnished with blades so configured that provide rotation of the lower rotors in two mutually opposite directions around a vertical axe.

The installation comprises a number of lower inductors (9) magnetically interacting with the lower rotors 2 and 3, the lower rotors 2 and 3 and the lower inductors 9 (shown on FIG. 2) form a lower electro-generator (4).

The installation comprises an orthogonal balanced wind-unit (6) including two short-circuited upper rotors (7) and (8), the upper rotors are furnished with blades so configured that provide rotation of the upper rotors 7 and 8 in two mutually opposite directions around the vertical axe, a number of upper inductors (similar to the lower inductors 9) magnetically interacting with the rotors 7 and 8, the upper rotors 7 and 8 and the upper inductors form an upper electro-generator (10).

The installation comprises a base structure (5) that includes a lower immovable polygon-shaped frame (11) serving as a base support, and an upper immovable polygon-shaped frame (similar to the lower frame 11). The upper and lower frames include outer rigid rods joined with each other in vertexes (12) of the frame, and inner rigid rods linking the non-adjacent vertexes 12 of the frame and joined with each other by means of internal junctions (13) formed in the crossing points of the inner rods. The upper frame and the lower frame are disposed in substantially parallel horizontal planes.

The base structure 5 includes a number of bottom anchors (not illustrated), a float unit (15), (e.g. in the form of a rigid hermetic pontoon) with positive buoyancy disposed below the freezing lever of the water reservoir and below the level of waves produced by winds. The float unit 15 is secured by means of anchor straps (16) to the bottom anchors.

The base structure 5 includes a linear tubular tower (14), preferably of a truss-type, supported by the float unit 15, wherein the lower and upper frames are fixedly attached to the tower 14 through the internal junctions 13, the lower inductors 9 are fixedly attached to the vertexes 12 of the lower frame 11, and the upper inductors are analogously fixedly attached to the vertexes of the upper frame. The float unit 15 may extend beyond the trajectory of blades of the rotors 2 and 3, if the points of attachment of the straps 16 are located accordingly (FIG. 1).

The base structure 5 includes a reinforced lower part (17) designed to withstand actions of water streams, waves, and ice.

In preferred embodiments, the installation comprises an observation chamber (18) with transparent walls for control of operation of the installation. Preferably, the installation also comprises an elevator (19) communicating with the chamber 18 to enable the personnel to get in and out the chamber. The installation may comprise an observation platform (20) disposed on the top of the base structure 5.

The installation is mounted at a chosen site of the reservoir to the bottom anchors via the straps 16 so that the hydro-unit 1 is situated below the water level of the reservoir, e.g. in the near-shore tidal zone, and the wind-unit 6 is situated above the water level. The water streams act upon the rotors 1 and 2 causing their rotation in the opposite directions, whereas the wind streams actuate the rotors 7 and 8 that also causes their rotation in the opposite directions. The inductors of the generators 4 and 10 generate electric current that is transmitted via electrical cables (not shown) to consumers.

The present invention can be advantageously used for design of non-polluting power plants deployable in the places of frequent high winds, tidal activities, and water currents, for example in coastal areas of seas and oceans.

I claim:

1. An installation for conversion of water and wind streams energy into electric energy comprising:
   an orthogonal balanced hydro-unit including
      at least two short-circuited lower rotors mounted in a water reservoir below the water level, said lower rotors are furnished with blades so configured that provide rotation of the lower rotors in two mutually opposite directions around a vertical axe,
      a number of lower inductors magnetically interacting with the lower rotors, said lower rotors and said lower inductors form a lower electro-generator;
   an orthogonal balanced wind-unit including
      at least two short-circuited upper rotors, said upper rotors are furnished with blades so configured that provide rotation of the upper rotors in two mutually opposite directions around said vertical axe,
      a number of upper inductors magnetically interacting with the upper rotors, said upper rotors and said upper inductors form an upper electro-generator; and
   a base structure including
      a lower immovable polygon-shaped frame and an upper immovable polygon-shaped frame, said frames each includes a plurality of outer rigid rods joined with each other in vertexes of the frame, and a plurality of inner rigid rods linking the non-adjacent vertexes of the frame and joined with each other by means of internal junctions formed in the crossing points of the inner rods, the upper frame and the lower frame are disposed in substantially parallel horizontal planes,
      a float unit with positive buoyancy disposed below the freezing lever of said water reservoir and below the level of waves produced by winds, said float unit is secured by means of anchor straps substantially to the bottom of said reservoir, and
      a linear tubular tower supported by said float unit;
      wherein said lower and upper frames are fixedly attached to said tower through the internal junctions, said lower inductors are fixedly attached to the vertexes of said upper frame and said upper inductors are fixedly attached to the vertexes of said lower frame.

2. The installation according to claim 1, wherein said tower is designed as a truss-type tower.

* * * * *